United States Patent
Coerman et al.

(10) Patent No.: US 10,532,656 B2
(45) Date of Patent: Jan. 14, 2020

(54) METHOD FOR OPERATING A MOTOR VEHICLE WITH SELECTABLE ALL-WHEEL DRIVE

(71) Applicant: FORD GLOBAL TECHNOLOGIES, LLC, Dearborn, MI (US)

(72) Inventors: Cyril Coerman, Leverkusen NRW (DE); Lucian Lippok, Cologne NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 208 days.

(21) Appl. No.: 15/828,656

(22) Filed: Dec. 1, 2017

(65) Prior Publication Data

US 2018/0201129 A1 Jul. 19, 2018

(30) Foreign Application Priority Data

Jan. 16, 2017 (DE) .................... 10 2017 200 551

(51) Int. Cl.
*B60K 23/08* (2006.01)
*B60W 10/119* (2012.01)
*B60W 30/045* (2012.01)
*B60W 40/072* (2012.01)

(52) U.S. Cl.
CPC ....... *B60K 23/0808* (2013.01); *B60W 10/119* (2013.01); *B60W 30/045* (2013.01); *B60W 40/072* (2013.01); *B60W 2520/125* (2013.01); *B60W 2520/14* (2013.01); *B60W 2520/28* (2013.01)

(58) Field of Classification Search
CPC .......... B60K 23/0808; B60W 10/119; B60W 30/045; B60W 40/072
See application file for complete search history.

(56) References Cited

U.S. PATENT DOCUMENTS

| | | |
|---|---|---|
| 5,105,901 A | 4/1992 | Watanabe et al. |
| 5,323,870 A | 6/1994 | Parigger et al. |
| 5,370,588 A | 12/1994 | Sawase et al. |
| 7,007,763 B2 | 3/2006 | Ginther et al. |
| 7,111,702 B2 | 9/2006 | Perlick et al. |
| 9,114,795 B2 | 8/2015 | Kaisha |

(Continued)

OTHER PUBLICATIONS

German Examination Report dated Dec. 15, 2017 for corresponding German Application No. 102017200551.3, 9 pages.

*Primary Examiner* — Michael D Lang
(74) *Attorney, Agent, or Firm* — David Kelley; Brooks Kushman P.C.

(57) ABSTRACT

The invention concerns a method for operating a motor vehicle with selectable all-wheel drive. The all-wheel drive is implemented with no central differential and the rear axle is implemented with no axle differential. The motor vehicle includes first and second partial clutches for independently decoupling left and right rear wheels from the drive train of the motor vehicle motor vehicle. The method includes determining a value that is representative of a ratio of the speeds of the front wheels to each other, comparing the value with a reference value, and disengaging the partial clutch that is associated with an outer rear wheel when the motor vehicle is turning, when the value is greater than the reference value, in order to prevent negative torques on the outer rear wheel.

11 Claims, 2 Drawing Sheets

(56) References Cited

U.S. PATENT DOCUMENTS

| | | | |
|---|---|---|---|
| 2005/0064993 A1* | 3/2005 | Ginther | B60K 23/04 477/166 |
| 2013/0103228 A1 | 4/2013 | Suzuki | |
| 2018/0099563 A1* | 4/2018 | Nozu | F16D 25/061 |

* cited by examiner

METHOD FOR OPERATING A MOTOR VEHICLE WITH SELECTABLE ALL-WHEEL DRIVE

CROSS-REFERENCE TO RELATED APPLICATIONS

This application claims foreign priority benefits under 35 U.S.C. § 119(a)-(d) to DE Application 10 2017 200 551.3 filed Jan. 16, 2017, which is hereby incorporated by reference in its entirety.

TECHNICAL FIELD

The invention concerns a method for operating a motor vehicle with selectable all-wheel drive. The invention further concerns a computer program product and a control unit for carrying out such a method and a motor vehicle with such a control unit.

BACKGROUND

An all-wheel drive shall mean a type of drive of a motor vehicle in which—in contrast to front or rear wheel drive—the drive force is fed to all wheels of the motor vehicle that contact the ground. Further and partly globally used designations for the all-wheel drive are AWD (All Wheel Drive) and in relation to four-wheel vehicles 4×4 (Four by Four) and 4WD (Four Wheel Drive).

The currently most frequent version consists of a single drive (mainly a combustion engine such as a gasoline or diesel engine), the power of which is distributed to a plurality of axles and wheels. All-wheel drives can be divided into two basic types from the technical viewpoint: differential-controlled or permanent all-wheel drives and clutch-controlled all-wheel drives.

Differential-controlled or permanent all-wheel drives comprise a central differential (also: longitudinal differential or center differential), which divides the drive power permanently to both axles and can be implemented as a limited slip differential.

Clutch-controlled all-wheel drives are also characterized by terms such as selectable, hang-on or on-demand. With said systems, one axle is permanently driven and the other axle is only supplied with power under certain circumstances. The clutch itself can be a simple claw clutch (manual activation), a viscous clutch, a centrifugal clutch or an electronically controlled friction clutch. The advantage of clutch-controlled all-wheel drives lies primarily in the lower system costs and in the possibility of configuring the motor vehicle with driving behavior that is typical of the marketplace as a front drive or as a rear drive in the normal mode and only to change to typical all-wheel driving behavior if required. The system with two single partial clutches and without differentials makes it possible to make the driving behavior more agile, and in the case of a front-drive vehicle to partially imitate the driving behavior of a vehicle with rear drive.

Such all-wheel drives are known for example from U.S. Pat. Nos. 5,105,901 A, 7,007,763 B2, 7,111,702 B2, 9,114,795 B2 and US 2013/0103228 A1.

As a result of the lack of differentials (central and rear axle differential) and the related automatic revolution rate equalization, the following problems can occur if both partial clutches are engaged in certain situations:

Stresses in the drive train at low speed and lateral acceleration. This presents itself for example in loud noise during parking, since the wheels have no revolution rate equalization, the shafts are stressed, and said stresses are suddenly reduced by scrubbing the tires. This results in vibrations and noise generation.

Unintended Understeering in Tight Turns:

The following only applies if the selectable axle is installed on the rear axle: The outer wheel in turns cannot produce positive torque owing to the lack of revolution rate equalization between the front axle and the rear axle. The front axle in turns runs on a smaller radius than the rear axle; the difference is greater in tighter turns. In the absence of revolution rate equalization, during engagement of the clutch of the outer rear wheel in turns the maximum speed is determined by the front axle, and thereby the maximum slip that can be achieved. If there is little slip on the main drive axle, and hence a low speed, this leads in tight turns to the rear outer wheel being decelerated when engaging the partial clutch and as a result a negative torque being produced, which in turn leads to an understeering yaw torque.

In combination with the much larger positive slip on the inner wheel in turns, here an understeering yaw torque is produced. In comparison to the outer wheel in turns, the inner wheel runs on a smaller radius. If both partial clutches are fully engaged, this is expressed in greater slip on the inner wheel, and thereby a greater torque. If the partial clutches are engaged in a tight turn here, a considerable torque can be applied, which will become linearly greater than the torque that can be applied to the outer wheel as the radius becomes tighter. This results in an understeering yaw torque, which can further boost the torque arising under point a.

Increased wear on the tires owing to the scrubbing of the tires.

Increased fuel consumption owing to the occurring negative torques mentioned under point 2.

There is therefore a need to detect the operating points at which the aforementioned problems arise and to take countermeasures so as not to adversely affect the ride comfort and the driving dynamics of a motor vehicle with such a selectable all-wheel drive without a central differential and without a rear axle differential.

SUMMARY

The object of the invention is achieved by a method with the steps:

determining a value representative of a ratio of the speeds of the front wheels relative to each other, comparing the value with a reference value, and disengaging the partial clutch associated with an outer rear wheel when the motor vehicle is turning, or disengaging both partial clutches if the value is greater than the reference value.

The invention thus proposes, depending on the driving situation, disengaging the partial clutches and, depending on the situation, decoupling the outer rear wheel in turns or decoupling both rear wheels from the drive train to thereby allow the respective wheel to roll freely. Thus, unwanted noise generation can be prevented, a reduced oversteer or increased understeer can be avoided and the wear on the tires and the fuel consumption of the motor vehicle can be reduced.

According to one embodiment, depending on a detected turn direction the value is proportional to the ratio of the difference of the speed of the respective front wheel on the outside of the turn and the speed of the respective front wheel on the inside of the turn to the average of the speeds of the front wheels. Thus, the average speed of the front wheels can be considered to be representative of the speed of the motor vehicle, which can be used to normalize the speed difference between the two front wheels. The value can thus also be considered to be a normalized front wheel speed difference and is a measure of the different speeds of the two front wheels while turning. The value contains the following information:

Turn radius: a tight turn radius causes a greater front axle speed difference.

Slip: in the case of a constant radius and high torque, the motor vehicle accelerates and hence the lateral acceleration increases. This reduces the load on the inner wheel in turns, whereby the inner wheel has greater slip than the outer wheel. This reduces the front axle speed difference. If the slip is too large, the value can even be negative.

Coefficient of friction: small coefficients of friction amplify the effect of slip.

For example, the motor vehicle can drive through a very wide turn with a large turn radius, wherein no drive torque is applied, and hence also only very small slip, whereby there is a small front wheel speed difference. If by contrast the motor vehicle is traversing a turn with a small turn radius and at the same time a large drive torque is acting, this causes a large slip on the inner front wheel in turns. Owing to the slip, the front wheel speed difference is also small here. If on the other hand the motor vehicle is traversing a turn with a medium turn radius and at the same time a small drive torque is acting and the highway is for example iced, this also causes a large slip on the inner front wheel, which leads to a small front wheel speed difference. In said three operating scenarios, there is a small front wheel speed difference and in all said operating scenarios the partial clutch associated with the outer rear wheel can be kept engaged, since such small speed differences can be disregarded. The respective speeds of the front wheels can for example be detected with respective wheel revolution rate sensors. Thus, already existing measurement values can be used and no structural changes to the motor vehicle are necessary.

According to a further embodiment, the reference value is representative of an operating point at which no torque is transferred to an outer rear wheel of the motor vehicle with the clutch engaged. In other words, the outer rear wheel is rolling freely. This is always the case if both partial clutches are partly or fully engaged and is so if a specified turn radius is too small or the slip—specified by the drive torque and the friction losses—is too low. If the value is greater than the reference value, the torque is negative, i.e. the outer rear wheel is decelerated, whereas the inner rear wheel is driven if the value is less than the reference value. Thus, the point in time for the disengagement and engagement of the clutch can be determined in a particularly simple way.

According to a further embodiment, a turn radius value is evaluated for determining the reference value. Thus, the radius of a currently traversed turn is taken into account and thus the accuracy with which the point in time for the disengagement and engagement of the clutch can be determined is increased.

According to a further embodiment, wheel speeds and/or a yaw rate of the motor vehicle are evaluated for determining the turn radius value. For determining the wheel speeds, wheel revolution rate sensors, for example of an ABS system of the motor vehicle, can be used, and/or for determining the yaw rate of the motor vehicle a yaw rate sensor of an ESP system of the motor vehicle can be used. Thus, already present measurement values can be used and no structural changes to the motor vehicle are necessary.

The invention further concerns a computer program product and a control unit for carrying out such a method and a motor vehicle with such a control unit.

The invention will now be described using a drawing. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
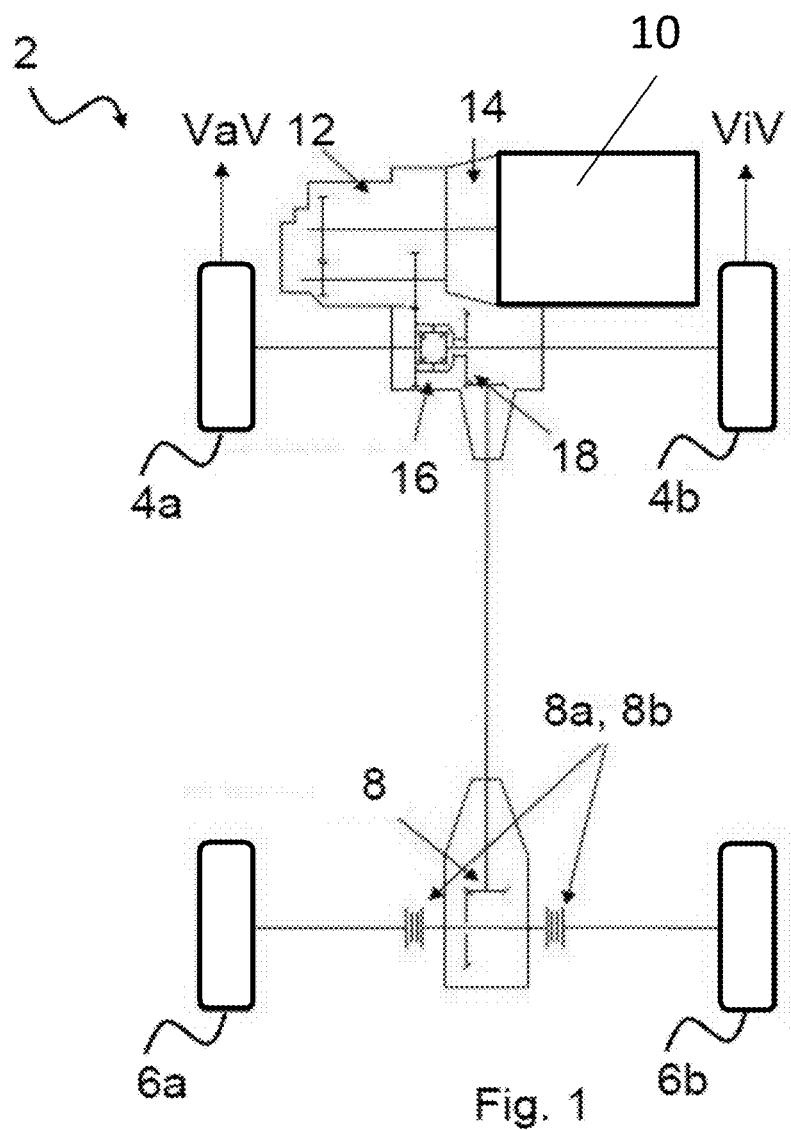
FIG. 1 shows a motor vehicle while turning in a schematic representation.

Referring to FIG. 1, a motor vehicle 2 is represented, such as for example a passenger vehicle. The motor vehicle comprises a selectable all-wheel drive, with which the two front wheels 4a, 4b are permanent and the two rear wheels 6a, 6b are selectable.

For this purpose, the motor vehicle 2 in the present exemplary embodiment comprises an engine 10, a manual gearbox 12, and a clutch 14 disposed between the engine 10 and the manual gearbox 12.

For revolution rate equalization, a front differential 16 is provided between the front wheels 4a, 4b. Power Take-off Unit 18 (PTU) can transfer power to the rear wheels 6a, 6b. A reduction gear 8 is provided between the PTU 18 and the rear wheels 6a, 6b.

FIG. 1 represents a right turn in which the left front wheel 4a is the outer front wheel and the right front wheel 4b is the inner front wheel and the left rear wheel 6a is the outer rear wheel and the right rear wheel 6b is the inner rear wheel. When traversing a left turn, the respective front wheels 4a, 4b and rear wheels 6a, 6b change the roles thereof as outer and inner front wheels 4a, 4b or outer and inner rear wheels 6a, 6b.

Between the two rear wheels 6a, 6b, a clutch assembly with a first partial clutch 8a and a second partial clutch 8b is disposed in the drive train of the motor vehicle 2, with which the respective, i.e. depending on the driving situation, outer rear wheel 6a, 6b can be decoupled from the drive train, so that it can turn freely.

The first partial clutch 8a and the second partial clutch 8b are each implemented in the present exemplary embodiment as friction clutches and are actuated by a control unit depending on the driving situation, as will be described in more detail below.

The all-wheel drive of the motor vehicle 2 has no central differential in the present exemplary embodiment and the rear axle has no axle differential, i.e. the all-wheel drive comprises neither a central differential nor a rear axle differential. In other words, the all-wheel drive of the motor vehicle 2 can also be considered to be a clutch-controlled all-wheel drive.

Owing to the lack of revolution rate equalization, the rigid connection between the rear wheels 6a, 6b and the drive train, which also drives the front wheels 4a, 4b, can lead to stresses in the drive train and noise when turning, such as for example during parking. When turning, the front wheels 4a, 4b follow a larger radius and have to move at higher speeds VaV, ViV than the rear wheels 6a, 6b. The rear wheels 6a, 6b are however forced to adopt the average speed of the two front wheels 4a, 4b if the two partial clutches 8a, 8b on the rear axle are engaged. Furthermore, the two rear wheels 6a, 6b are forced to turn at the same speed as one another. The result of this—depending on the design of the chassis of the motor vehicle 2—is reduced oversteer or increased understeer. Moreover, increased wear, in particular of the tires on the rear wheels 6a, 6b, and increased fuel consumption can occur.

In order to counteract this, the control unit is implemented to determine a value nDV that is representative of a ratio of the speed VaV of the left front wheel 4a and the speed ViV of the right front wheel 4b to each other, to compare the value nDv with a reference value ZT, and to disengage the respective partial clutch 8a or 8b, which is associated with an outer rear wheel 6a of the motor vehicle 2, if the value nDV is greater than the reference value ZT. The reference value ZT is taken from a two-dimensional table for this purpose, wherein the reference value ZT is determined by a current turn radius and a lateral acceleration.

During this, the control unit determines the value nDV depending on a detected turn direction by determining the ratio of the difference of the speed VaV of the respective front wheel on the outside of the turn 4a and the speed ViV of the respective front wheel on the inside of the turn 4b to the average of the speeds VaV, ViV of the front wheels 4a, 4b:

$$nDV=(VaV-ViV)/(0.5*(VaV+ViV))$$

The value nDV can also be considered to be the normalized front wheel speed difference and is a measure of the difference between the speeds ViV, VaV of the two front wheels 4a, 4b while turning. The value nDV is representative of the size of the slip on the front wheels 4a, 4b, which is a function of the drive torque and a coefficient of friction for the friction between the tires and the road surface. In other words, the average speed of the front wheels 4a, 4b can thus be assumed to be representative of the speed of the motor vehicle, which can be used to normalize the speed difference between the two front wheels 4a, 4b.

The reference value ZT is representative of an operating point at which, with the partial clutches 8a, 8b engaged, no torque is transmitted to an outer rear wheel 6a of the motor vehicle 2. If the value nDV exceeds the reference value ZT, the motor vehicle 2 is at an operating point at which the aforementioned problems occur. This is now described with additional reference to FIG. 2.

Figure 2:
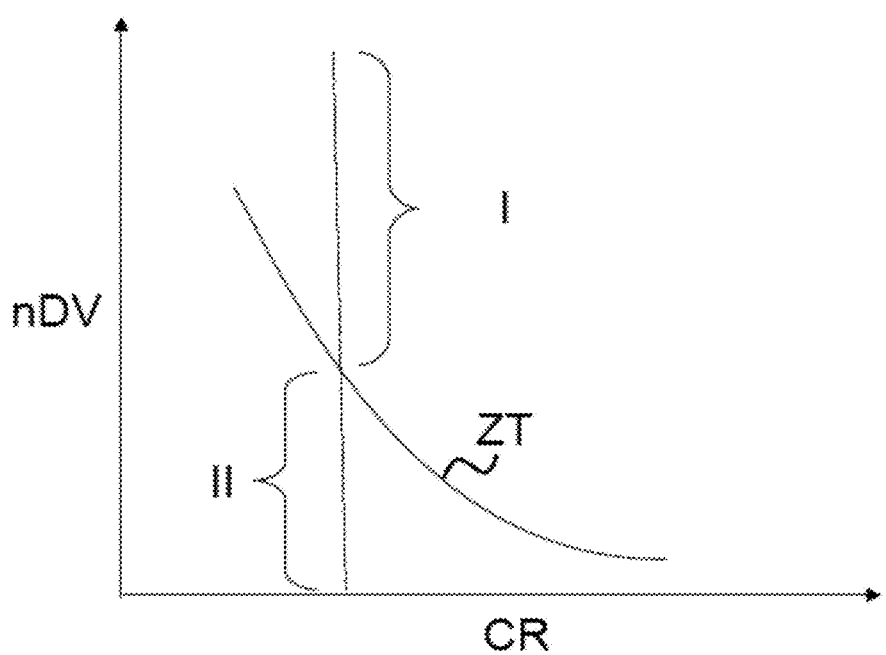
FIG. 2 shows the relationships of various relevant values.

FIG. 2 shows the relationship of the reference value ZT to a turn radius CR of a turn and the value nDV.

It can be seen that the relationship is similar to a profile of an exponential function with negative exponents. Furthermore, it can be seen that for tight turns the value nDV can be somewhat larger than for straight-ahead travel.

For a given turn radius, for example 20 meters, for values of the value nDV or the normalized front wheel speed difference above the graph in the region I, i.e. of the reference value ZT, the outer rear wheel 6b is subjected to a negative torque, i.e. is decelerated, whereas for values for the value nDV or the normalized front wheel speed difference below the graph in the region II, i.e. of the reference value ZT, the outer rear wheel 6b is subjected to a positive torque.

In order to counteract understeer by decelerating the outer rear wheel 6b, therefore the respective partial clutch 8a or 8b is disengaged if the value nDV is greater than the reference value ZT.

The relationship of the reference value ZT to a turn radius CR of a turn and the value nDV that is represented in FIG. 2 can for example be acquired experimentally in the form of a characteristic field provided in the control unit.

The control unit can comprise hardware components and/or software components for the described functions and tasks.

During operation, the control unit determines the value nDV depending on a detected turn direction by determining the ratio of the difference of the speed VaV of the respective outer front wheel 4a and the speed ViV of the respective inner front wheel 4b to the average of the speeds VaV, ViV of the front wheels 4a, 4b.

The control unit then compares the value nDv with a reference value ZT that is representative of an operating point at which no torque is transmitted to an outer rear wheel 6a of the motor vehicle 2 with the partial clutch 8a engaged. In this case, for determining the reference value ZT in the present exemplary embodiment, a turn radius value CR of a turn is evaluated, wherein wheel speeds and/or a yaw rate of the motor vehicle 2 are used for this purpose.

If the result of a comparison carried out by the control unit of the value nDV with the reference value ZT is that the value nDV is greater than the reference value ZT, i.e. lies in the region I, the control unit produces a control signal for actuating the partial clutch 8a, on receiving which the respective partial clutch 8a is disengaged, so that the outer rear wheel 6a of the motor vehicle 2 can roll freely. However, if the motor vehicle 2 is traversing a very wide turn with a large turn radius, wherein no drive torque is applied, and hence there is also only very little slip, a small front wheel speed difference arises. If the motor vehicle 2 is traversing a turn with a small turn radius and at the same time a large drive torque is acting, this causes a large slip on the respective inner front wheel 4a, 4b. Because of the slip, the front wheel speed difference is also small here. If on the other hand the motor vehicle 2 is traversing a turn with a medium turn radius and at the same time a small drive torque is acting and the highway is for example iced, this also causes a large slip on the respective inner front wheel that results in a small front wheel speed difference. In said three operating scenarios, there is a small front wheel speed difference and in all said operating scenarios the partial clutch 8a, 8b associated with the respective outer rear wheel 6a, 6b can be kept engaged, since such small speed differences can be ignored.

Thus, unwanted noise generation can be prevented, reduced oversteer or increased understeer can be avoided and the wear on the tires and the fuel consumption of the motor vehicle 2 can be reduced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a motor vehicle with selectable all-wheel drive, wherein the all-wheel drive is implemented with no central differential and a rear axle is implemented with no axle differential, wherein the motor vehicle comprises a first partial clutch for decoupling a first rear wheel from a drive train of the motor vehicle and a second partial clutch for decoupling a second rear wheel from the drive train of the motor vehicle, the method comprising:

determining a value that is representative of a slip of front wheels, wherein the value is a ratio of a difference of a speed of the respective outer front wheel and a speed of the respective inner front wheel to an average of the speeds of the front wheels;

comparing the value with a reference value, wherein the reference value is representative of a slip relative to a current turn radius at which the torque transmitted to the outer rear wheel of the motor vehicle transitions from a positive value to a negative value when the partial clutch that is associated with the outer rear wheel is engaged;

maintaining engagement of one of the partial clutches when the motor vehicle is turning if the value is less than the reference value to transmit positive torque on an outer rear wheel; and disengaging one of the partial clutches when the motor vehicle is turning if the value is greater than the reference value to prevent negative torque on the outer rear wheel.

2. The method of claim 1 wherein the value is proportional to a ratio of a difference of a speed of the respective outer front wheel and a speed of the respective inner front wheel to an average of the speeds of the front wheels.

3. The method of claim 1 wherein the reference value is representative of an operating point at which no torque is transmitted to the outer rear wheel of the motor vehicle with the partial clutch that is associated with the outer rear wheel engaged.

4. The method of claim 3 wherein the reference value is based on a turn radius value.

5. The method of claim 4 wherein the turn radius value is based on at least one of wheel speeds, yaw rate, and lateral acceleration of the motor vehicle.

6. A vehicle comprising:

a differential driving front wheels such that, when turning, an outer front wheel rotates faster than an inner front wheel;

a first clutch configured to selectively drive an outer rear wheel at an average speed of the front wheels; and a controller programmed to, determine a current slip of the front wheels based on a ratio of a difference of a speed of the respective outer front wheel and a speed of the respective inner front wheel to an average of the speeds of the front wheels, determine a reference slip value relative to a current turn radius when the first clutch is engaged that corresponds to an operating point at which the torque transmitted to an outer rear wheel of the motor vehicle transitions from a positive value to a negative value as the slip of the front wheels increases, maintain engagement of the first clutch responsive to the current slip of the front wheel being less than the reference slip value, and disengage the first clutch responsive to the current slip of the front wheel exceeding the reference slip value.

7. The vehicle of claim 6 further comprising a second clutch configured to selectively drive an inner rear wheel at the average speed the front wheels.

8. The vehicle of claim 6 wherein the is equal to a ratio of a difference between an outer front wheel speed and an inner front wheel speed to the average speed of the front wheels.

9. The vehicle of claim 8 wherein the threshold is a function of a turn radius.

10. The vehicle of claim 9 wherein the controller computes the turn radius based on sensed front wheels speeds and a sensed yaw rate.

11. The vehicle of claim 9 wherein the threshold is also a function of a lateral acceleration rate.

* * * * *